A. E. O'NEILL.
AUTOMOBILE SIGNAL.
APPLICATION FILED DEC. 11, 1916.
1,257,733.
Patented Feb. 26, 1918.
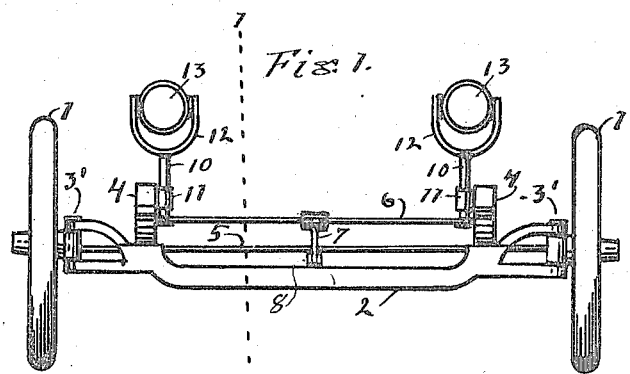
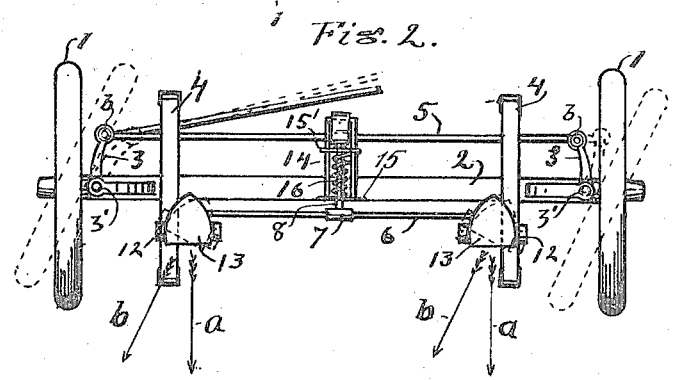
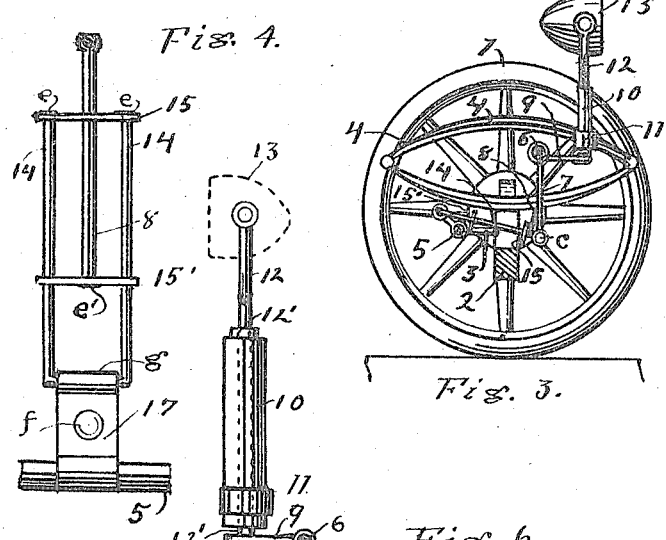
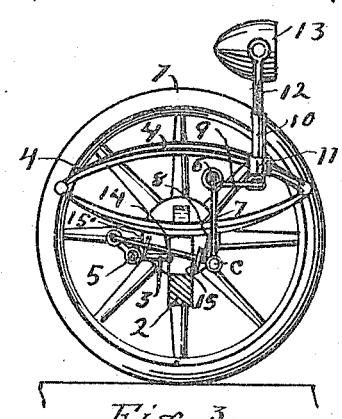
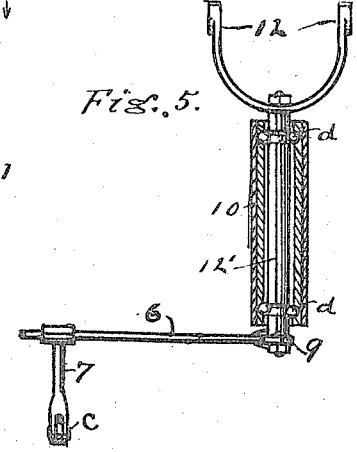
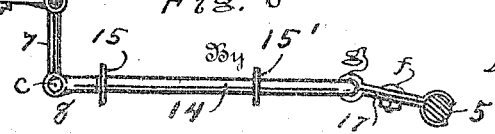
Inventor
Albert E. O'Neill,
By
Attorney

UNITED STATES PATENT OFFICE.

ALBERT E. O'NEILL, OF GRAND RAPIDS, MICHIGAN.

AUTOMOBILE-SIGNAL.

1,257,733.

Specification of Letters Patent.  Patented Feb. 26, 1918.

Application filed December 11, 1916. Serial No. 136,342.

*To all whom it may concern:*

Be it known that I, ALBERT E. O'NEILL, a citizen of the United States, residing at Grand Rapids, in the county of Kent and State of Michigan, have invented certain new and useful Improvements in Automobile-Signals, of which the following is a specification.

My invention relates to improvements in direction indicators and the mounting of head lights on automobiles and its objects are: first, to so mount the head lights on automobiles that the rays of light therefrom will always be held in direct alinement with the forward wheels of the automobiles, thus not only illuminating the track the wheels are to travel, but, at the same time indicating the direction an automobile is about to proceed, whether directly ahead, or to the right or to the left; second, to so arrange the connecting elements between the steering bar and the lamp actuating bar that it may be readily adapted to any automobile steering gears, and, third, to so mount the head lights and the actuating mechanism that they will not be affected by sudden jars of the automobile, as when running over rough roads, through ruts, &c.

I attain these objects by the mechanism illustrated in the accompanying drawing, in which Figure 1 is a front elevation of the front axletree and wheels of an automobile with my appliance attached; Fig. 2 is a plan of the same; Fig. 3 shows the axletree in section and the wheel and appliance in elevation as looking to the right from the line 1—1 of Fig. 1; Fig. 4 is a plan of the adjustable connecting arm with the actuating spring removed; Fig. 5 shows the lamp supporting sleeve in section to disclose the internal construction thereof, and its connection with the several other elements of my invention, and, Fig. 6 is a side elevation of the supporting sleeve and its several connecting elements that go to make up an operative combination of parts necessary for the attainment of the several objects hereinbefore stated.

Similar reference characters refer to similar parts throughout the several views shown in the drawing.

In the accompanying drawing 1 represents the forward wheels of an automobile, and 2 represents the axletree. 3 represents the steering arms on the wheel hubs, 3' the pivotal connection between the axletree and the wheel hub; 4, 4 represent the springs or supporting frame for the automobile body; 5 represents the steering rod that connects and actuates the steering arms on the wheel hubs, and 12 and 13 represent the lamp yokes and the lamps, respectively.

In my construction I provide sleeves 10 that are provided with ball bearings, as indicated at $d$, $d$, which sleeves are securely mounted upon the spring frames by means of any properly applied supporting element, as the clamp 11, so the sleeve will be held firmly in place. I then pass the lamp yoke stem 12' through the sleeve and securely connect an actuating arm, as 9 at the lower end of each lamp yoke stem. I then provide a rod 6 that is pivotally connected, at the ends, with the end of each of the arms 9, 9 so that any movement that is transmitted to the rod 6 will be communicated to the arms 9, 9 so the lamps 13 will be made to turn with their yokes to an extent corresponding with the longitudinal movement of the rod 6, as indicated by the arrows $a$, and $b$ in Fig. 2.

I provide for transmitting longitudinal movement to the rod 6, when turning the wheels to the right or to the left, by pivotally securing a connecting rod to the steering rod 5 and the lamp actuating rod 6, and to make this connecting rod adjustable in all necessary respects I make it up of several parts, as follows: The arm 7 is securely connected with, and extends downward from the lamp actuating rod 6 to a position practically parallel with the steering rod 5. The shaft or rod 8 of the connecting rod is pivotally connected, at one end, with the lower end of the arm 7, as at $c$, and the other end of this shaft is securely connected with the sliding member 15', as at $e'$, so the sliding member 15' must always move with the shaft 8. I then provide two side shafts or rods, 14, 14 that are securely connected with the sliding member 15, as at $e$, $e$; the opposite ends being connected, or made integral for the pivotal connection of the link 17, as at $g$, the sliding member 15 being adapted to slide freely on the shaft or rod 8, while the sliding member 15' slides freely on the rods 14, 14. I then place a spring 16, see Fig. 2, around the shaft 8 between the sliding-members 15 and 15'. By this means I have provided for a flexible longitudinal adjustment of the connecting rod. The link 17 is designed to allow of the adjustment of the connecting rod to various distances between the steering rod 5 and the lamp actuating rod 6, as follows: In some instances the relative positions of the rods 5 and 6 may be such as to require the link to assume the position indicated in Fig. 3, while in other cases these rods may be so far apart as to require the link to assume the position indicated in Fig. 6, or any position intermediate between the two, hence the need for, and the pivotal connection of the link at the end of the connecting rod.

As hereinbefore intimated, one end of the link 17 is pivotally connected with the connected ends of the rods 14, 14, as at $g$, and the other end of the link is firmly clamped upon the rod 5, so that any longitudinal movement of the rod 5, for changing the positions of the wheels 1, 1 to steer the automobile out of a direct course, as indicated by the dotted outlines of the wheels in Fig. 2, will be transmitted to the rod 6, and through the action of the rod 6 upon the arms 9, 9 the lamps will be simultaneously turned from a direct line forward, indicated by the arrows $a$, to the same degree or angle to one side, or the other from the direct course, as indicated by the arrows $b$, preferably parallel with the positions of the wheels as indicated by the dotted lines in Fig. 2.

I sometimes provide for turning the lamps a little farther from a direct line than the wheels are turned by making the arms 9, 9 somewhat shorter than the arms 3, 3. This is advantageous when turning a corner upon roads of uncertain quality, as it reveals the condition of the road more perfectly in the direction the wheels will take than would be possible if the rays of light were cast only directly parallel with the wheel.

I provide for avoiding sudden shocks by reason of rough roads, by means of the pivotal connection at $c$, which will allow the link end of the connecting rod to be moved suddenly and forcibly up and down without having any effect upon the rod 6, thus averting the danger of suddenly jarring the lamps.

The link 17 may be secured in place upon the rod 6 by any available device, as by the bolt $f$ in Fig. 6.

What I claim as new, and desire to secure by Letters Patent of the United States, is:

In combination with automobile lamps, and a steering rod of an automobile, sleeves securely connected with the frame of the automobile, lamp yokes revolubly mounted in said sleeves, arms extending backward at right angles with, and securely connected with the lower end of the lamp yokes, a rod pivotally connected with said arms, a central arm on said rod, a connecting rod having longitudinal sliding connections for longitudinal adjustment, one end of said adjustable connecting rod pivotally connected with the central arm, a spring for holding the parts of the adjustable connecting rod in normal positions, and a link pivotally connected at one end with the connecting rod and securely connected at the other end with the steering rod, substantially as shown and described.

Signed at Grand Rapids, Michigan, December 7, 1916.

ALBERT E. O'NEILL.

Copies of this patent may be obtained for five cents each, by addressing the "Commissioner of Patents, Washington, D. C."